July 17, 1962  J. L. HALL ETAL  3,044,312
MECHANISM FOR CONVERTING ROTARY TO LINEAR MOVEMENT
Filed May 20, 1960  2 Sheets-Sheet 1
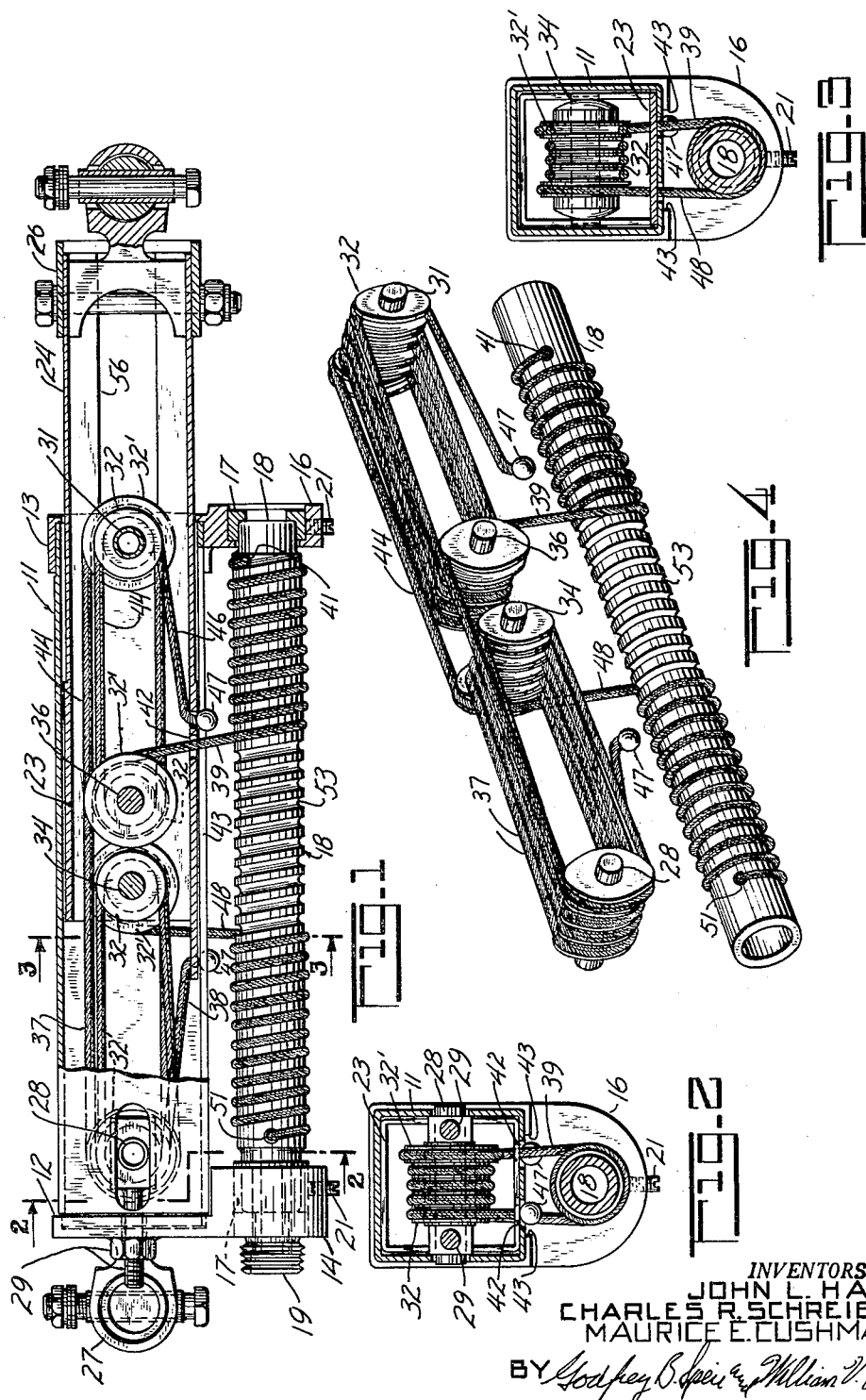
INVENTORS
JOHN L. HALL
CHARLES R. SCHREIBER
MAURICE E. CUSHMAN
ATTORNEYS July 17, 1962 J. L. HALL ETAL 3,044,312
MECHANISM FOR CONVERTING ROTARY TO LINEAR MOVEMENT
Filed May 20, 1960 2 Sheets-Sheet 2
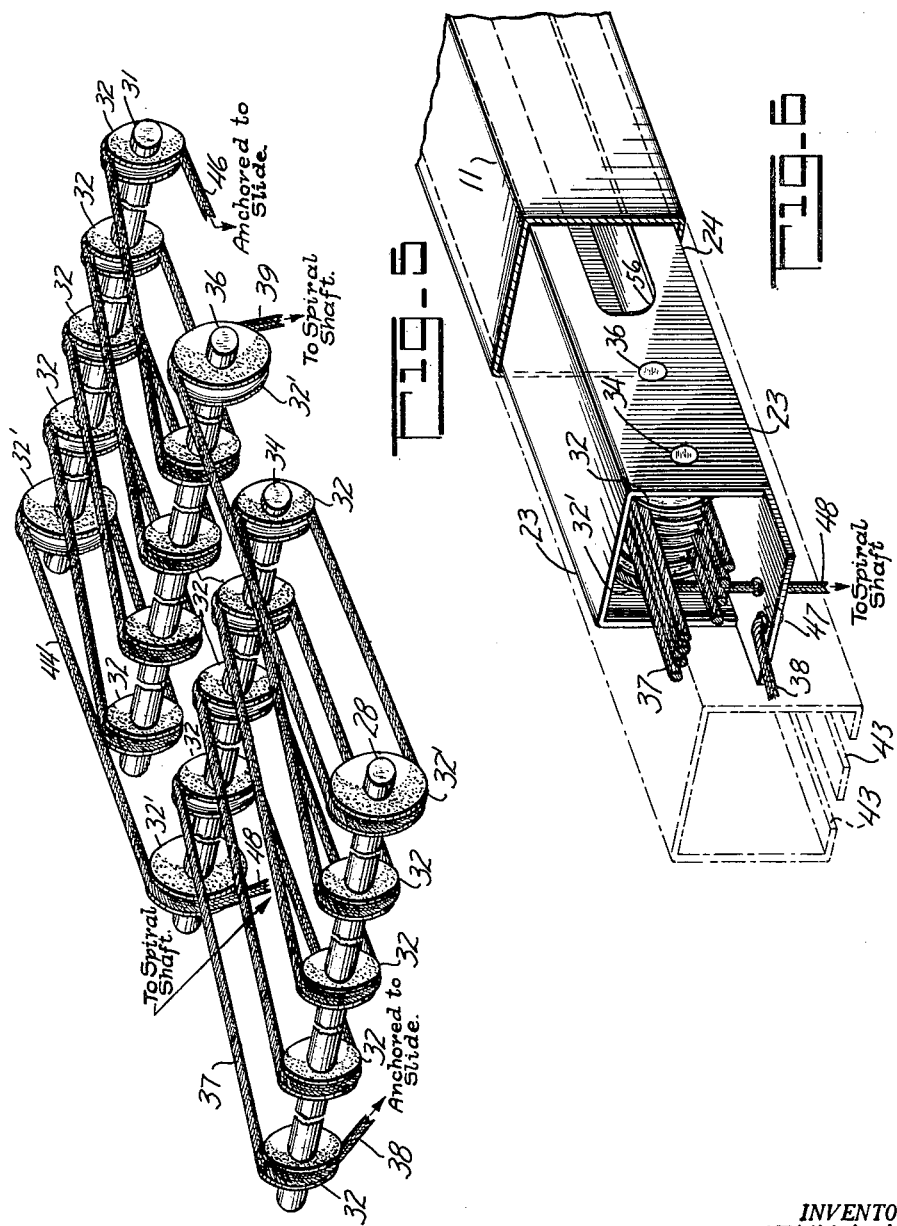
INVENTORS
JOHN L. HALL
CHARLES R. SCHREIBER
MAURICE E. CUSHMAN
BY
ATTORNEY 3,044,312
MECHANISM FOR CONVERTING ROTARY TO
LINEAR MOVEMENT
John L. Hall, Hanover, Charles R. Schreiber, West Caldwell, and Maurice E. Cushman, Verona, N.J., assignors to Curtiss-Wright Corporation, a corporation of Delaware
Filed May 20, 1960, Ser. No. 30,603
11 Claims. (Cl. 74—95)

This invention relates to mechanisms for converting rotary to linear movement. Relatively few prior mechanisms of this sort lend themselves to actuator applications where it is necessary to operate at considerable loads at elevated temperatures.

It is an object of the present invention to provide an actuator device which is capable of sustained immersion in a high temperature environment and which will be fully operative at any time during such immersion.

A further object of the invention is to provide a novel and compact mechanism incorporating the classical principles of the block and tackle, augmenting said principles and providing compact and convenient means for operating the device with a rotary input.

A further object is to provide improvements in a device of the sort mentioned which render it free from undesired backlash.

An exemplary embodiment of the invention is illustrated in the attached drawings which disclose the general principles of the invention and a desirable way in which it may be constructed. It should be realized, however, that various changes and modifications may be made in the arrangements shown without departing from the spirit and scope of the invention.

In these drawings in which similar reference characters indicate similar parts,

FIG. 1 is a side elevation of the actuator, partly in section,

FIG. 2 is a section on the line 2—2 of FIG. 1,

FIG. 3 is a section on the line 3—3 of FIG. 1,

FIG. 4 is a perspective elevation showing the relationship of essential parts of the actuator, FIG. 5 is an expanded perspective elevation showing the relationship of certain components of the invention, and FIG. 6 is a perspective elevation, partly in section, showing portions of the actuator.

The mechanism shown in the drawings is designed to enable rotary motion to be converted to limited linear motion in a manner such that there will always be a positive position relation between the linear output element and the rotary input element. We provide a structural support and housing, preferably but not necessarily, comprising a square tube 11 with a closed-end fitting 12 at one end and an open-end fitting 13 at the other. The fitting 12 includes an offset bearing portion 14 and the fitting 13 includes an offset bearing portion 16 in axial alinement with the bearing portion 14. Within these portions are bushings 17 in which is journalled a rotatable shaft 18, one end of the shaft, its left end as shown, comprising a rotary drive coupling 19. The shaft 18 and the bushings 17 may be moved axially in their bearings for adjustment purposes and they are secured by appropriate means such as set screws 21.

Within the housing 11 is loosely sleeved a carriage 23 in the form of a square tube, this carriage having an extension 24 protruding from the housing 11 through the fitting 13 and provided at its exposed end with a fitting 26 adapted to be secured to a driven load. The opposite end of the housing 11, from that through which the extension 24 protrudes, is provided with a fitting assembly 27 adapted to be secured to a fixed mounting.

At the left end of the housing 11 as shown, a journal member 28 is contained, this journal member being slidable a limited distance in the housing and secured to the housing end 12 through nut-bolt connections 29. A journal member 31 is secured at the right end of the housing. On each journal member 28 and 31 a plurality of co-axial sheaves 32 are journalled, preferably on roller bearings.

Within the carriage 23 are secured two spaced journal members 34 and 36, each carrying a plurality of independently rotatable sheaves 32, all of these sheaves being preferably carried on roller bearings. Connections between the sheaves 32 on the journal members 28 and 34 are established by a line or cable reeved back and forth over the sheaves on the respective journal members. One end of the cable or line comprises a becket line 38 secured to the carriage 23 at 47. From here, the line 37 passes successively back and forth over the sheaves 32 until, on the last run, the cable passes over a sheave 32' of slightly larger diameter than the sheaves 32 to another larger diameter sheave 32' on the journal member 36. Thence, the lead line portion 39 extends transversely out of the carriage and housing, to be wound upon the shaft or drum 18, the free end of the lead line, after several wraps around the shaft being secured to the shaft as at 41. The lead line 39 passes through a hole 42 formed in the carriage 23 and through a longitudinal slot 43 formed in the housing 11.

At the other end of the assembly, a line 44 is reeved back and forth over the sheaves 32 on the journals 31 and 36, the becket line 46 of this line being secured to the carriage at 47, and the final run of the line passing over an enlarged sheave 32' on the journal 31 and then over an enlarged sheave 32' on the journal 34. Thence, the lead line 48 of line 44 extends transversely from the housing, through another opening 42 in the carriage and another slot 43 in the housing. This lead line is wrapped upon the shaft 18 in the opposite direction from the wrap of the lead line 39 and is secured to the shaft at 51.

It will now be seen that rotation of the shaft 18 passes off one line to its sheaves while it wraps the other line onto the shaft from its sheaves. For example, if the shaft 18 is rotated clockwise as in FIG. 4, the cable 37 through its lead line 39 will be wound upon the shaft 18, drawing the journals 28 and 34 toward one another. Concurrently, the lead line 48 forming part of the line 44 is paid off the shaft 18 as it turns counterclockwise to allow the journal 36 to move away from the journal 31. A considerable mechanical advantage is gained in thus converting rotary to linear motion through the multi-part block and tackle assemblies, the latter being comprised by the journals and the multiple sheaves. In the arrangement shown, using a nine-part block and tackle array at each end of the mechanism, a nine to one mechanical advantage is obtained for traversing the carriage in either direction, accordingly as the shaft 18 is rotated in either direction.

To tighten the lines or cables and thus to prevent backlash in the system the nut-bolt connections 29 may be tightened up whereby the entire cable array is placed under tension. In order that the lines 37 and 44 be not overstressed by flattening, the grooves in the sheaves are preferably made substantially semi-circular to support a substantial part of the circumference of each line, the grooves likewise being flared toward their peripheries to the extent required so that the line will reeve on and off the sheaves without abrading against sharp corners. For the same purpose the shaft 18 is provided with a helical groove 53, the groove being of flared semi-circular section. The advance or lead of the helical groove 53 is so chosen that line will pass off and on the shaft freely as the latter is rotated, to hold the lead lines 48 and 39 in tangential inclined attitude.

If a single cable tensioning arrangement, such as the nut-bolt connection 29, is used in the mechanism, it will be seen that cable tightening may shift the positioning of the carriage 23 relative to the axial position of the shaft 18. The axial adjustment of the shaft 18, previously described, is provided so that the position of the shaft after tightening may be regulated to enable the lead lines 39 and 48 to make the optimum angles with the shaft groove 53.

By appropriate bearing materials and high temperature lubricants, and proper selection of the material used in constituting the actuator it can be constructed to operate continuously in high temperature environments of the order of 800° to 1000° Fahrenheit, with good efficiency. It is recognized that a block and tackle system of the sort described carries implicit limitations on efficiency, but these limitations may be unimportant as compared with the more difficult problem of creating an actuator capable of sustained satisfactory operation at high temperatures.

Actuators constructed according to the general design philosophy of this invention have been found quite successful. Many of the classical design criteria for block and tackle systems are preferably used in an actuator of this sort, such as, for instance, an optimum relation of line diameter to sheave diameter, very flexible lines made up preferably of multiple strands of stainless steel wire, and some of the more modern high temperature solid lubrication techniques for the sheaves on their journals.

The use of certain larger sheaves 32' in connection with the regular sheaves 32 enables the line runs to be arranged in a very compact manner so that various runs of the line are free from contact with one another, thus avoiding further efficiency loss and possible snarling of the parts of the lines. However, changes may be made in the rigging of the system so that pulleys of one size may be used throughout.

Various other modes for carrying and supporting the sheaves, for the housing, and for the output element 24 of the assembly will readily occur to those skilled in the art. In this connection it should be pointed out that the extension 24 is slotted at its side portions, as at 56, to enable the extension to move back and forth in the housing 23 without interference with the journals 31.

It will be clear to those skilled in the art that various changes and modifications may be made in the structure shown and described without departing from the spirit and scope of the invention as set out in the appended claims.

We claim:

1. A mechanism for converting rotary to linear motion comprising a pair of telescoping members one of which is an elongated structure having a sheave journalled at each end and the other of which is a carriage movable relative thereto having sheaves journalled thereon, lines secured to said carriage, each extending to and reeved over respective structure sheaves and then extending back toward said carriage and reeved over respective carriage sheaves and then extending transversely out from said carriage, a rotatable drum journalled on said structure extending longitudinally thereof, and the transversely extending line portions being wound around said drum in opposite directions and secured thereto.

2. Mechanism according to claim 1 including pluralities of sheaves on the carriage and at the ends of said structure over which said lines are sequentially reeved.

3. Mechanism according to claim 1 including a helical groove on said drum in which said lines are seated, for winding on and off the drum as the drum is rotated, said helical groove having a pitch corresponding to the travel of said carriage on said structure resulting from a single turn of said drum.

4. Mechanism according to claim 1 including means for adjusting the position of said sheaves relative to said structure for regulating line tension.

5. Mechanism according to claim 1 including means associated with said structure for regulating line tension.

6. Mechanism according to claim 3 including means for axially adjusting the position of said drum whereby the cable running on and off it runs smoothly into and from said groove.

7. Mechanism according to claim 2 wherein each plurality of carriage sheaves includes one of larger diameter than the others, and wherein the line portions extending transversely from the carriage pass initially over said larger sheaves.

8. A mechanical device for converting rotary to linear motion comprising a pair of telescoping members one of which is an elongated structure having a rotatable drum extending therealong and journalled therein and the other of which is a carriage, a stack of sheaves journalled for independent rotation at each end of said structure on axes transverse thereto, said carriage being linearly movable along said structure between said stacks of sheaves, two stacks of sheaves journalled on said carriage on axes substantially parallel to the axes of the first said sheaves, line secured at one end to one end of said drum and wound therearound, reeving over sheaves of one carriage stack and over sheaves at one end of said structure, the other end of said line being secured on said carriage, and another line secured at one end to the other end of said drum and wound therearound, reeving over sheaves of the other carriage stack and over the sheaves at the other end of said structure, the other end of said second line being secured on said carriage.

9. Mechanism according to claim 8 wherein said drum is helically grooved, the portions of said line wound on said drum lying in said groove.

10. Mechanism according to claim 9 including means to adjust the axial position of said drum relative to said carriage whereby the lines will run into and out of said groove on a sloped tangent.

11. Mechanism according to claim 8 including means to adjust the tension of said lines to eliminate backlash in the travel of said carriage and the turning of said drum.

References Cited in the file of this patent

UNITED STATES PATENTS

| | | |
|---|---|---|
| 222,742 | Schofield | Dec. 16, 1879 |
| 1,734,546 | Veling | Nov. 5, 1929 |
| 2,598,709 | Morris | June 3, 1952 |